UNITED STATES PATENT OFFICE.

BERNARD H. SMITH, OF BROOKLYN, AND JOHN R. EOFF, JR. OF NEW YORK, N. Y., ASSIGNORS TO GARRETT & COMPANY, INC., A CORPORATION OF NEW YORK.

MANUFACTURING FLAVORING EXTRACTS WITH HIGHER ALCOHOLS.

1,384,680.     Specification of Letters Patent.     Patented July 12, 1921.

No Drawing.    Application filed July 26, 1920. Serial No. 399,089.

*To all whom it may concern:*

Be it known that we, BERNARD H. SMITH and JOHN R. EOFF, Jr., citizens of the United States, and residents of Brooklyn, in the county of Kings and State of New York, and New York city, in the county and State of New York, respectively, have invented certain new and useful Improvements in Manufacturing Flavoring Extracts with Higher Alcohols, of which the following is a full, clear, and exact specification.

This invention relates to flavoring extracts, and has for its object to produce extracts from various flavoring materials by the use of the higher alcohols, above the ethyl form, as a solvent, either alone or admixed with other solvents such as ethyl alcohol, ethyl acetate, glycols, glycerin, etc.

By the higher alcohols is meant the alcohols of the paraffin series known as the monatomic saturated alcohols, such as the propyl, butyl and amyl alcohols. Iso-propyl or secondary propyl alcohol, also called dimethyl carbinol, has been found especially useful for the purposes mentioned.

These higher alcohols, and particularly iso-propyl alcohol, have been found to be good solvents for many different flavoring materials, such as lemon, orange, mace, wintergreen, peppermint, cassia, clove and almond oils, vanilla, etc., and may be used in the pure form or in diluted state, water being preferably used as the diluting material. The butyl and amyl alcohols are not miscible with water in all proportions, so that their use in diluted form cannot be so general as iso-propyl alcohol which has been found to be miscible with water in all proportions.

We have found that in making extracts using iso-propyl alcohol,

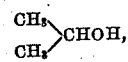

as the solvent it is possible to make clear and perfect solutions with any of the above mentioned flavoring materials, as well as many others. The percentage of flavoring material used with the solvent may be varied of course according to the particular flavoring materials employed and also according to the degree of concentration desired. Thus, the percentage by volume of flavoring material may vary widely from 1% to 60%, the percentage of solvent varying inversely from 40% to 98%.

The percentage by volume of water in the solvent used may also vary from nothing to 85%, the percentage of pure iso-propyl alcohol varying inversely from 15% to 100%.

The following are given as illustrations of the way our invention is practised in preparing some of the most common extracts:—

*Lemon extract.*—For ordinary strength, 5% by volume of lemon oil is dissolved in 95% of iso-propyl alcohol of any strength between 75% and 100%, that is to say, the 95% of iso-propyl alcohol used may be pure or diluted with water up to 25%. If lemon extract of double strength is desired 10% by volume of lemon oil is used with 90% of iso-propyl alcohol of any strength between 82% and 100%.

*Orange extract.*—For ordinary strength, 5% by volume of orange oil is used with 95% of iso-propyl alcohol of any strength between 80% and 100%, while for double strength 10% of orange oil is used with 90% of iso-propyl alcohol of any strength between 82% and 100%.

*Vanilla extract.*—For ordinary strength 10% of vanilla beans is used with 90% of iso-propyl alcohol of any strength between 30% and 100%. The iso-propyl alcohol, either pure or in a water solution of any percentage between the figures mentioned, may be used directly to extract the vanilla bean by any of the well known methods such as percolation, masceration or digestion, or the vanilla beans may be extracted with a diluted solution of ethyl alcohol, said ethyl alcohol evaporated off under diminished pressure, and the flavoring material remaining redissolved with the iso-propyl alcohol, so that the resulting product contains no ethyl alcohol.

*Almond extract.*—One strength may be obtained by using 1% by volume of almond oil with 99% iso-propyl alcohol of any strength between 22% and 100%.

Iso-propyl alcohol is miscible with ethylene glycol, $C_2H_4(OH)_2$, propylene glycol, $C_3H_6(OH)_2$, glycerin and ethyl alcohol, as well as water, and any of these alcohols may be admixed with the iso-propyl form to produce the solvents for the flavoring materials instead of using iso-propyl alcohol alone or simply with water.

While several specific formulas are given herein, and still other flavoring materials are mentioned, the present invention is not limited to any of the flavors specifically or generally mentioned, and the right is reserved to the use of any or all of the higher alcohols above the ethyl form, either alone or admixed with the other forms of alcohol mentioned, for the purposes specified herein.

Having thus described our invention, what we claim as new and desire to secure by Letters Patent of the United States is:—

1. A flavoring extract consisting of flavoring material dissolved in one of the higher alcohols, above ethyl, of the paraffin series.

2. A flavoring extract consisting of flavoring material dissolved in iso-propyl alcohol.

3. A flavoring extract consisting of flavoring material dissolved in one of the higher alcohols, above ethyl, of the paraffin series, in substantially the proportions by volume of between 1% and 60% of the flavoring material and 99% to 40% of the alcohol specified.

4. A flavoring extract consisting of flavoring material dissolved in one of the higher alcohols, above ethyl, of the paraffin series, in substantially the proportions by volume of between 1% and 60% of the flavoring material and between 99% and 40% of the alcohol specified, said alcohol being used in a water solution of from 15% up.

5. A flavoring extract consisting of flavoring material dissolved in iso-propyl alcohol in substantially the proportions by volume of between 1% and 60% of the flavoring material and between 99% and 40% of the alcohol specified.

6. A flavoring extract consisting of flavoring material dissolved in iso-propyl alcohol in substantially the proportions by volume of between 1% and 60% of the flavoring material and between 99% and 40% of the alcohol specified, said alcohol being used in a water solution of from 15% up.

7. A flavoring extract consisting of flavoring material dissolved in an admixture of one of the higher alcohols, above ethyl, of the paraffin series, and another solvent.

8. A flavoring extract consisting of flavoring material dissolved in an admixture of one of the higher alcohols, above ethyl, of the paraffin series, and another alcohol.

9. A flavoring extract consisting of flavoring material dissolved in an admixture of iso-propyl alcohol and another solvent.

10. A flavoring extract consisting of flavoring material dissolved in an admixture of iso-propyl alcohol and another alcohol.

11. A process of preparing a flavoring extract which consists in extracting the flavoring material with ethyl alcohol, then evaporating off said ethyl alcohol and finally redissolving the extracted material in another kind of alcohol.

In testimony whereof we have signed our names to this specification.

BERNARD H. SMITH.
JOHN R. EOFF, Jr.